United States Patent
Tsuji et al.

(10) Patent No.: US 11,578,223 B2
(45) Date of Patent: Feb. 14, 2023

(54) ACTINIC RADIATION-CURABLE INKJET INK, IMAGE FORMING METHOD AND IMAGE FORMING APPARATUS

(71) Applicant: Konica Minolta, Inc., Tokyo (JP)

(72) Inventors: Yasuaki Tsuji, Kanagawa (JP); Kouji Izawa, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 530 days.

(21) Appl. No.: 16/726,418

(22) Filed: Dec. 24, 2019

(65) Prior Publication Data

US 2020/0231831 A1 Jul. 23, 2020

(30) Foreign Application Priority Data

Jan. 23, 2019 (JP) .............................. JP2019-009495

(51) Int. Cl.
 *C09D 11/38* (2014.01)
 *C08L 33/10* (2006.01)
 *B41J 2/01* (2006.01)
 *C08K 5/00* (2006.01)

(52) U.S. Cl.
 CPC ................ *C09D 11/38* (2013.01); *B41J 2/01* (2013.01); *C08K 5/0041* (2013.01); *C08L 33/10* (2013.01); *B41J 2002/012* (2013.01)

(58) Field of Classification Search
 CPC ..... C09D 11/101; C09D 11/322; C09D 11/30; C09D 11/40; C09D 133/06; B41J 11/00214; B41J 2/2107; B32B 38/145
 See application file for complete search history.

(56) References Cited

U.S. PATENT DOCUMENTS

| 6,114,411 | A | * | 9/2000 | Nakamura | ........... | C09D 11/322 523/161 |
|---|---|---|---|---|---|---|
| 6,972,303 | B1 | * | 12/2005 | Miyabayashi | ......... | C09D 11/30 524/553 |
| 2003/0069329 | A1 | * | 4/2003 | Kubota | ................ | B41J 11/0015 523/160 |
| 2008/0047463 | A1 | * | 2/2008 | Tanoue | .................. | C09D 11/40 106/31.89 |
| 2010/0086701 | A1 | * | 4/2010 | Iftime | .................. | C09D 11/101 524/556 |

(Continued)

FOREIGN PATENT DOCUMENTS

| JP | 2015-040281 A | 3/2015 |
|---|---|---|
| JP | 2016-216584 A | 12/2016 |

(Continued)

OTHER PUBLICATIONS

Office Action dated Aug. 23, 2022, for the corresponding Japanese Patent Application No. 2019-009495, with English translation.

*Primary Examiner* — John Zimmermann
(74) *Attorney, Agent, or Firm* — Lucas & Mercanti, LLP (57) ABSTRACT

An actinic radiation-curable inkjet ink according to the present invention contains an actinic radiation polymerizable compound and a linear styrene (meth)acrylic acid ester copolymer dissolved therein. The styrene (meth)acrylic acid ester copolymer has a softening point of 30 to 120° C., and a content of the styrene (meth)acrylic acid ester copolymer is 1 to 50 wt % based on a total mass of the actinic radiation-curable inkjet ink.

20 Claims, 1 Drawing Sheet

(56) References Cited

U.S. PATENT DOCUMENTS

| | | | | |
|---|---|---|---|---|
| 2012/0200633 | A1* | 8/2012 | Aoyama | ............... B41J 2/155 |
| | | | | 347/100 |
| 2013/0307913 | A1* | 11/2013 | Kawashima | ........... B41J 2/2117 |
| | | | | 106/31.77 |
| 2014/0333704 | A1* | 11/2014 | Takabayashi | .......... B41J 2/2107 |
| | | | | 347/102 |

FOREIGN PATENT DOCUMENTS

| | | |
|---|---|---|
| JP | 2017-132861 A | 8/2017 |
| WO | 2013054317 A1 | 4/2013 |
| WO | 2016/002834 A1 | 1/2016 |

* cited by examiner

ACTINIC RADIATION-CURABLE INKJET INK, IMAGE FORMING METHOD AND IMAGE FORMING APPARATUS

CROSS REFERENCE TO RELATED APPLICATIONS

The entire disclosure of Japanese Patent Application No. 2019-009495 filed on Jan. 23, 2019, is incorporated herein by reference in its entirety.

BACKGROUND

Technological Field

The present invention relates to an actinic radiation-curable inkjet ink, an image forming method and an image forming apparatus.

Description of Related Art

Since images can be simply and inexpensively produced by an inkjet method, this method is applied in various fields of printing including photographs, various printing, marking, and special printing such as color filtering. In particular, digital printing can be performed without using a printing plate by the inkjet method, and hence, this method is particularly suitable for use for making a few printings of a variety of images.

As one type of inkjet inks, an ink containing, as a liquid component, an actinic radiation polymerizable compound that is cured through irradiation with an actinic radiation (hereinafter simply referred to also as an "actinic radiation-curable ink") is known. When droplets of an actinic radiation-curable ink are caused to land on a surface of a recording medium and the thus landed droplets are irradiated with an actinic radiation, a cured film formed by a collection of dots obtained by curing the ink droplets is formed on the surface of the recording medium. A desired image can be formed by forming such a cured film.

A method for improving characteristics of an actinic radiation-curable inkjet ink by causing the ink to contain a resin different from an actinic radiation polymerizable compound has been proposed. For example, WO2013/054317 discloses an actinic radiation-curable composition containing a photopolymerization initiator, a radical polymerizable monomer and an acrylic polymer. According to this publication, when an acrylic polymer having a glass transition point of −130° C. or more and −10° C. or less is contained, an actinic radiation-curable composition capable of increasing the sensitivity of the ink and forming a flexible and rigid image can be provided.

According to the invention described in WO2013/054317, the curing sensitivity of the ink is increased and an odor of a formed image is reduced by using the actinic radiation-curable composition containing the acrylic polymer, so that an image improved in adhesion and flexibility can be formed. Besides, according to the invention described in WO2013/054317, since the actinic radiation-curable composition containing the acrylic polymer is used, formation of an image improved in ejection stability, for example, having less nozzle missing, is achieved.

Here, an inkjet ink is also desired to further inhibit occurrence of satellites that can be caused during ink ejection.

SUMMARY

An object of the present invention is, in consideration of the aforementioned points, to provide an actinic radiation-curable inkjet ink capable of inhibiting occurrence of satellites, an image forming method using the actinic radiation-curable ink and an image forming apparatus for use in practicing the image forming method.

To achieve at least one of the abovementioned objects, according to an aspect of the present invention, an actinic radiation-curable inkjet ink reflecting one aspect of the present invention comprises a linear styrene (meth)acrylic acid ester copolymer dissolved in an actinic radiation polymerizable compound, wherein the styrene (meth)acrylic acid ester copolymer has a softening point of 30 to 120° C., and a content of the styrene (meth)acrylic acid ester copolymer is 1 to 50 wt % based on a total mass of the actinic radiation-curable inkjet ink.

To achieve at least one of the abovementioned objects, according to an aspect of the present invention, an image forming method reflecting one aspect of the present invention comprises: ejecting, from an inkjet head, the actinic radiation-curable inkjet ink described above; and irradiating, with an actinic radiation, the actinic radiation-curable inkjet ink ejected from the inkjet head and attached to a recording medium.

To achieve at least one of the abovementioned objects, according to an aspect of the present invention, an image forming apparatus reflecting one aspect of the present invention comprises: an inkjet head that ejects the actinic radiation-curable inkjet ink described above; and an actinic radiation irradiator that irradiates, with an actinic radiation, the actinic radiation-curable inkjet ink ejected from the inkjet head and attached to a recording medium.

BRIEF DESCRIPTION OF DRAWINGS

The advantageous and features provided by one or more embodiments of the invention will become more fully understood from the detailed description given hereinbelow and the appended drawing which are given by way of illustration only, and thus are not intended as a definition of the limits of the present invention.

DETAILED DESCRIPTION OF EMBODIMENTS

Hereinafter, one or more embodiments of the present invention will be described with reference to the drawing. However, the scope of the invention is not limited to the disclosed embodiments.

[Actinic Radiation-Curable Ink]

One embodiment of the present invention relates to an actinic radiation-curable inkjet ink (hereinafter simply referred to also as the "actinic radiation-curable ink") containing an actinic radiation polymerizable compound and a linear styrene (meth)acrylic acid ester copolymer. The styrene (meth)acrylic acid ester copolymer has a softening point of 30 to 120° C. Besides, a content of the styrene (meth)acrylic acid ester copolymer is 1 to 50 wt % based on a total mass of the actinic radiation-curable ink.

(Styrene (Meth)Acrylic Acid Ester Copolymer)

The styrene (meth)acrylic acid ester copolymer is linear. The styrene (meth)acrylic acid ester copolymer is contained in a content of preferably 1 to 50 wt %, and more preferably 2 to 30 wt % based on the total mass of the actinic radiation-curable inkjet ink. It is noted that the linear styrene (meth)acrylic acid ester copolymer (hereinafter simply referred to also as the "styrene (meth)acrylic acid ester copolymer") is dissolved in a liquid component mainly containing an actinic radiation polymerizable compound in the actinic radiation-curable ink. Being linear may include that the styrene (meth)acrylic acid ester copolymer has a branched chain in a part of its molecule, but means that the copolymer is linear as a whole to an extent that it can be oriented in one direction. The styrene (meth)acrylic acid ester copolymer has, however, preferably no branched structure in its molecule.

When the styrene (meth)acrylic acid ester copolymer is used, occurrence of satellites that can be caused during ink ejection can be inhibited. This is probably because a constituent unit, of the copolymer, derived from a (meth)acrylic acid-based monomer having high affinity with the actinic radiation polymerizable compound captures the actinic radiation polymerizable compound so as to increase internal cohesive force. The styrene (meth)acrylic acid ester copolymer thus captures and holds the actinic radiation polymerizable compound, and hence, scattering of the actinic radiation polymerizable compound from droplets ejected from an inkjet head is inhibited, resulting in inhibiting the occurrence of satellites.

Besides, since the styrene (meth)acrylic acid ester copolymer is linear, molecular extension in a flowing direction of the actinic radiation-curable ink is easily caused. Therefore, at the time of the ejection of the actinic radiation-curable ink, the styrene (meth)acrylic acid ester copolymer straightens ink flow in a nozzle of the inkjet head so as to reduce fluid friction. Also because a shear force applied to the ink is reduced owing to the reduction of the fluid friction by the straightening, the occurrence of scattering of minute sprays (satellites) from the ejected ink can be probably inhibited in using the styrene (meth)acrylic acid ester copolymer.

When the styrene (meth)acrylic acid ester copolymer is a random copolymer, the molecular extension of the styrene (meth)acrylic acid ester copolymer is smoothly caused during its flow accompanied by the ejection of the actinic radiation-curable ink. Therefore, it seems that the occurrence of scattering of minute sprays (satellites) from the ejected ink can be more satisfactorily inhibited owing to the reduction of the fluid friction.

A styrene-based monomer, that is, a material of the styrene (meth)acrylic acid ester copolymer, is a monomer containing a styrene structure and having an ethylenic unsaturated bond capable of performing radical polymerization. Examples of the styrene-based monomer include styrene, o-methylstyrene, m-methylstyrene, p-methylstyrene, p-methoxystyrene, p-phenylstyrene, p-chlorostyrene, p-ethylstyrene, p-n-butylstyrene, p-tert-butylstyrene, p-n-hexylstyrene, p-n-octylstyrene, p-n-nonylstyrene, p-n-decylstyrene, p-n-dodecylstyrene, and derivatives thereof. One of these styrene-based monomers may be singly used, or two or more of these may be used in combination.

Examples of a (meth)acrylic acid ester-based monomer, that is, a material of the styrene (meth)acrylic acid ester copolymer, include methyl acrylate, ethyl acrylate, butyl acrylate, 2-ethylhexyl acrylate, cyclohexyl acrylate, phenyl acrylate, methyl methacrylate, ethyl methacrylate, butyl methacrylate, hexyl methacrylate, 2-ethylhexyl methacrylate, ethyl 3-hydroxyacrylate, propyl y-aminoacrylate, stearyl methacrylate, dimethylaminoethyl methacrylate and diethylaminoethyl methacrylate. One of these (meth)acrylic acid ester-based monomers may be singly used, or two or more of these may be used in combination.

The styrene (meth)acrylic acid ester copolymer can be obtained by performing polymerization by any of known polymerization methods such as bulk polymerization, solution polymerization, emulsion polymerization, miniemulsion polymerization, suspension polymerization and dispersion polymerization with an arbitrary usually used polymerization initiator, such as a peroxide, a persulfide or an azo compound, added in polymerization of the above-described monomers.

(Chain Transfer Agent)

In synthesis of the styrene (meth)acrylic acid ester copolymer, a chain transfer agent is preferably used. The chain transfer agent is not especially limited, and a usually used chain transfer agent, such as a cobalt complex, a quinone-based compound, alkyl mercaptan, a mercapto fatty acid ester, an cc methyl styrene dimer or ethyl α-p-toluenesulfonyl methyl acrylate is preferably used. Here, the term "chain transfer agent" refers to a compound to be added to a polymerization reaction system for purposes of, for example, adjusting a polymerization degree of a resultant polymer.

Examples of the chain transfer agent include mercaptan such as octyl mercaptan, and mercaptopropionic acid such as n-octyl-3-mercaptopropionate. An added amount of the chain transfer agent varies depending on a desired molecular weight or molecular weight distribution, and is preferably in a range of 0.00001 to 20.0 wt % based on an added amount of the polymerizable monomer. When the chain transfer agent is contained in an amount falling in the above-described range, the polymerization degree of the polymer can be adjusted as desired.

The styrene (meth)acrylic acid ester copolymer has a softening point of preferably 30 to 120° C.

The softening point can be measured using a flow tester, CFT500 (manufactured by Shimadzu Corporation) or the like.

Besides, the styrene (meth)acrylic acid ester copolymer has a weight average molecular weight (Mw) of preferably 1,000 to 40,000 g/mol, and more preferably 2,000 to 40,000 g/mol.

The weight average molecular weight (Mw) of the styrene (meth)acrylic acid ester copolymer can be a value obtained through measurement with GPC and conversion using a polystyrene standard calibration curve.

Furthermore, the styrene (meth)acrylic acid ester copolymer has a glass transition point of preferably 10 to 60° C. When the glass transition point falls in this range, problems of bleed out and the like can be avoided in an image obtained after a curing reaction, and thus, image quality can be retained.

In addition, the styrene (meth)acrylic acid ester copolymer has an acid value of preferably 60 mgKOH/g or less. When the acid value falls in this range, compatibility with the actinic radiation polymerizable compound can be set within a proper range to inhibit excessive increase of the viscosity of the actinic radiation-curable ink.

The acid value herein refers generally to the number of milligrams of potassium hydroxide necessary for neutralizing a carboxy group, a sulfone group or the like contained in 1 g of a sample. The acid value can be measured in accordance with JIS K0070-1992 (Neutralization Titration).

The actinic radiation-curable ink preferably contains a plurality of styrene (meth)acrylic acid ester copolymers each having a different softening point. Here, the plurality of styrene (meth)acrylic acid ester copolymers each have a different softening point by 5° C. or more so that effects of the dissolved copolymers cannot conflict with each other. When the plurality of styrene (meth)acrylic acid ester copolymers each having a different softening point by 5° C. or more are contained, a cure rate obtained after landing on a recording medium and image gloss can be adjusted.

(Actinic Radiation Polymerizable Compound)

The actinic radiation polymerizable compound is a compound crosslinking or polymerizing through irradiation with an actinic radiation, and constitutes a solvent phase of the actinic radiation-curable ink. Examples of the actinic radiation include ultraviolet light, infrared light, electron beams, α rays, γ rays and X rays. Among these actinic radiations, ultraviolet light or electron beams are preferred. Examples of the actinic radiation polymerizable compound include a cationic polymerizable compound, a radical polymerizable compound and a mixture of these. Among these actinic radiation polymerizable compounds, a radical polymerizable compound is preferred. It is noted that the actinic radiation polymerizable compound may be any one of a monomer, a polymerizable oligomer, a prepolymer and a mixture of any of these.

A radical polymerizable compound refers to a compound having, in a molecule, an ethylenic unsaturated double bond group. The radical polymerizable compound can be a monofunctional or polyfunctional compound. An example of the radical polymerizable compound includes (meth)acrylate, that is, an unsaturated carboxylic acid ester compound. In the present invention, the term "(meth)acrylate" means acrylate or methacrylate, the term "(meth)acryloyl group" means an acryloyl group or a methacryloyl group, and the term "(meth)acryl" means acryl or methacryl.

It goes without saying that polymerizable compounds described as examples below do not limit the effects of the present invention.

Examples of monofunctional (meth)acrylate include isoamyl (meth)acrylate, stearyl (meth)acrylate, lauryl (meth)acrylate, octyl (meth)acrylate, decyl (meth)acrylate, isomyristyl (meth)acrylate, isostearyl (meth)acrylate, 2-ethylhexyl-diglycol (meth)acrylate, 2-hydroxybutyl (meth)acrylate, 2-(meth)aciyloyloxyethylhexahydrophthalic acid, butoxyethyl (meth)acrylate, ethoxydiethylene glycol (meth)acrylate, methoxydiethylene glycol (meth)acrylate, methoxy polyethylene glycol (meth)acrylate, phenoxyethylene glycol (meth)acrylate, methoxypropylene glycol (meth)acrylate, phenoxyethyl (meth)acrylate, tetrahydrofurfuryl (meth)acrylate, isobornyl (meth)acrylate, 2-hydroxyethyl (meth)acrylate, 2-hydroxypropyl (meth)acrylate, 2-hydroxy-3-phenoxypropyl (meth)acrylate, 2-(meth)aciyloyloxyethylsuccinic acid, 2-(meth)aciyloyloxyethylphthalic acid, 2-(meth)aciyloyloxyethyl-2-hydroxyethyl-phthalic acid, and t-butylcyclohexyl (meth)acrylate.

Examples of polyfunctional (meth)acrylate include difunctional (meth)acrylates such as triethylene glycol di(meth)acrylate, tetraethylene glycol di(meth)acrylate, polyethylene glycol di(meth)acrylate, tripropylene glycol di(meth)acrylate, polypropylene glycol di(meth)acrylate, 1,4-butanediol di(meth)acrylate, 1,6-hexanediol di(meth)acrylate, 1,9-nonanediol di(meth)acrylate, neopentyl glycol di(meth)acrylate, dimethylol-tricyclodecane di(meth)acrylate, PO adduct di(meth)acrylate of bisphenol A, hydroxypivalic acid neopentyl glycol di(meth)acrylate, polytetramethylene glycol di(meth)acrylate, polyethylene glycol diacrylate and tripropylene glycol diacrylate; trifunctional (meth)acrylates such as trimethylolpropane tri(meth)acrylate, pentaerythritol tri(meth)acrylate and ethoxylated glycerin triacrylate; tri- or higher functional (meth)acrylates such as pentaerythritol tetra(meth)acrylate, dipentaerythritol hexa (meth)acrylate, ditrimethylolpropane tetra(meth)acrylate, glycerin propoxy tri(meth)acrylate and pentaerythritol ethoxy tetra(meth)acrylate; and oligomers having a (meth) acryloyl group, including polyester acrylate oligomers, and modified products thereof. Examples of such a modified product include ethylene oxide-modified (EO-modified) acrylate into which an ethylene oxide group is introduced, and propylene oxide-modified (PO-modified) acrylate into which propylene oxide is introduced.

A cationic polymerizable compound is a compound having, in a molecule, a cationic polymerizable group. Examples of the cationic polymerizable compound include an epoxy compound, a vinyl ether compound, and an oxetane compound.

Examples of the epoxy compound include alicyclic epoxy resins such as 3,4-epoxycyclohexylmethyl-3',4'-epoxycyclohexane carboxylate, bis(3,4-epoxycyclohexylmethyl)adipate, vinylcyclohexene monoepoxide, ε-caprolactone-modified 3,4-epoxycyclohexylmethyl 3',4'-epoxycyclohexane carboxylate, 1-methyl-4-(2-methyloxiranyl)-7-oxabicyclo [4,1,0]heptane, 2-(3,4-epoxycyclohexyl-5,5-spiro-3,4-epoxy)cyclohexanone-meta-dioxane and bis(2,3-epoxycyclopentyl)ether, aliphatic epoxy compounds including 1,4-butanediol diglycidyl ether, 1,6-hexanediol diglycidyl ether, glycerin triglycidyl ether, trimethylolpropane triglycidyl ether, polyethylene glycol diglycidyl ether, propylene glycol diglycidyl ether, and polyether polyol polyglycidyl ethers obtained by adding one or more alkylene oxides (ethylene oxide, propylene oxide, and the like) to aliphatic polyhydric alcohols such as ethylene glycol, propylene glycol and glycerin, and aromatic epoxy compounds including di- or polyglycidyl ether of bisphenol A or an alkylene oxide adduct thereof, di- or polyglycidyl ether of hydrogenated bisphenol A or an alkylene oxide adduct thereof, and a novolac epoxy resin.

Examples of the vinyl ether compound include monovinyl ether compounds including ethyl vinyl ether, n-butyl vinyl ether, isobutyl vinyl ether, octadecyl vinyl ether, cyclohexyl vinyl ether, hydroxybutyl vinyl ether, 2-ethylhexyl vinyl ether, cyclohexanedimethanol monovinyl ether, n-propyl vinyl ether, isopropyl vinyl ether, isopropenyl ether-o-propylene carbonate, dodecyl vinyl ether, diethylene glycol monovinyl ether and octadecyl vinyl ether, and di- or trivinyl ether compounds including ethylene glycol divinyl ether, diethylene glycol divinyl ether, triethylene glycol divinyl ether, propylene glycol divinyl ether, dipropylene glycol divinyl ether, butanediol divinyl ether, hexanediol divinyl ether, cyclohexanedimethanol divinyl ether and trimethylolpropane trivinyl ether.

Examples of the oxetane compound include 3-hydroxymethyl-3-methyloxetane, 3-hydroxymethyl-3-ethyloxetane, 3-hydroxymethyl-3-propyloxetane, 3-hydroxymethyl-3-normal-butyloxetane, 3-hydroxymethyl-3-phenyloxetane, 3-hydroxymethyl-3-benzyloxetane, 3-hydroxyethyl-3-methyloxetane, 3-hydroxyethyl-3-ethyloxetane, 3-hydroxyethyl-3-propyloxetane, 3-hydroxyethyl-3-phenyloxetane, 3-hydroxypropyl-3-methyloxetane, 3-hydroxypropyl-3-ethyloxetane, 3-hydroxypropyl-3-propyloxetane, 3-hydroxypropyl-3-phenyloxetane, 3-hydroxybutyl-3-methyloxetane, 1,4bis{[(3-ethyl-3-oxetanyl)methoxy]methyl}benzene, 3-ethyl-3-(2-ethylhexyloxymethyl)oxetane, and di[1-ethyl(3-oxetanyl)]methyl ether.

A content of the actinic radiation polymerizable compound is, for example, preferably 1.0 wt % or more and 97 wt % or less, and more preferably 30 wt % or more and 90 wt % or less based on the total mass of the actinic radiation-curable ink.

Besides, the actinic radiation-curable ink preferably contains a combination of the plurality of actinic radiation polymerizable compounds each having a different number of functional groups. Here, the plurality of actinic radiation polymerizable compounds each having a different number of functional groups preferably include a first actinic radiation polymerizable compound having 1 or 2 functional groups, and a second actinic radiation polymerizable compound having more functional groups than those of the first actinic radiation polymerizable compound. At the same time, the actinic radiation-curable ink contains, as a dissolving solvent phase of the styrene (meth)acrylic acid ester copolymer, at least one actinic radiation polymerizable compound selected from the group consisting of the monofunctional actinic radiation polymerizable compounds and difunctional actinic radiation polymerizable compounds, and at least one actinic radiation polymerizable compound selected from the group consisting of the difunctional actinic radiation polymerizable compounds and trifunctional actinic radiation polymerizable compounds.

(Gelling Agent)

The actinic radiation-curable ink may contain a gelling agent.

The gelling agent is an organic substance that is a solid at ordinary temperature and can be formed into a liquid by heating so as to allow the actinic radiation-curable ink to undergo sol-gel phase transition in accordance with temperature change.

The gelling agent is preferably crystallized in the ink at a temperature equal to or lower than the gelation temperature of the ink from the following points of view. The term "gelation temperature" herein refers to a temperature at which the viscosity of the ink is rapidly changed by phase transition of the ink from sol to gel during cooling of the ink formed into sol or liquefied by heating. Specifically, the gelation temperature of the ink can be determined as a temperature at which the viscosity is rapidly increased during cooling of the ink formed into sol or liquefied, with the viscosity measured using a rheometer, "MCR302" (manufactured by Anton Paar GmbH).

When the gelling agent is crystallized in the ink, a structure in which the actinic radiation polymerizable compound is surrounded in a three-dimensional space formed by the gelling agent crystallized into a plate shape (hereinafter, which structure is referred to as the "card house structure") may be formed in some cases. Formation of such a card house structure allows the actinic radiation polymerizable compound in the form of a liquid to be held in the space, and therefore, a dot formed by the landing of the ink is further hardly wetted and spread, resulting in enhancing the pinning properties of the ink. When the pinning properties of the ink are thus enhanced, a combination of neighboring dots formed by the landing of the ink on a recording medium seems to be difficult to occur.

As the gelling agent, substances generally called waxes are preferably used. Examples of the gelling agent include aliphatic ketone compounds such as dipentadecyl ketone, diheptadecyl ketone, dilignoceryl ketone, dibehenyl ketone, distearyl ketone, dieicosyl ketone, dipalmityl ketone, dimyristyl ketone, lauryl myristyl ketone, lauryl palmityl ketone, myristyl palmityl ketone, myristyl stearyl ketone, myristyl behenyl ketone, palmityl stearyl ketone, palmityl behenyl ketone and stearyl behenyl ketone; aliphatic ester compounds such as cetyl palmitate, stearyl stearate, behenyl behenate, icosyl icosanoate, behenyl stearate, palmityl stearate, lauryl stearate, stearyl palmitate, myristyl myristate, cetyl myristate, octyldodecyl myristate, stearyl oleate, stearyl erucate, stearyl linoleate, behenyl oleate and arachidyl linoleate; amide compounds such as N-lauroyl-L-glutamic acid dibutylamide and N-(2-ethylhexanoyl)-L-glutamic acid dibutylamide; dibenzylidene sorbitols such as 1,3:2,4-bis-O-benzylidene-D-glucitol; petroleum-based waxes such as paraffin wax, microcrystalline wax and petrolatum; plant-based waxes such as candelilla wax, carnauba wax, rice wax, Japan wax, jojoba oil, jojoba solid wax and jojoba ester; animal-based waxes such as beeswax, lanolin and spermaceti; mineral based waxes such as montan wax and hydrogenated wax; hydrogenated castor oil and hydrogenated castor oil derivative; modified waxes such as a montan wax derivative, a paraffin wax derivative, a microcrystalline wax derivative and a polyethylene wax derivative; higher fatty acids such as behenic acid, arachidic acid, stearic acid, palmitic acid, myristic acid, lauric acid, oleic acid and erucic acid; higher alcohols such as stearyl alcohol and behenyl alcohol; hydroxystearic acid such as 12-hydroxystearic acid; a 12-hydroxystearic acid derivative; fatty acid amides such as lauryl acid amide, stearic acid amide, behenic acid amide, oleic acid amide, erucic acid amide, ricinoleic acid amide and 12-hydroxystearic acid amide; N-substituted fatty acid amides such as N-stearyl stearic acid amide and N-oleyl palmitic acid amide; special fatty acid amides such as N,N'-ethylenebisstearylamide, N,N'-ethylenebis-12-hydroxystearylamide and N,N'-xylylenebisstearylamide; higher amines such as dodecyl amine, tetradecyl amine and octadecyl amine; fatty acid ester compounds such as stearyl stearic acid, oleyl palmitic acid, glycerin fatty acid ester, sorbitan fatty acid ester, propylene glycol fatty acid ester, ethylene glycol fatty acid ester and polyoxyethylene fatty acid ester; sucrose fatty acid esters such as sucrose stearic acid and sucrose palmitic acid; synthetic waxes such as polyethylene wax and α-olefin maleic anhydride copolymer wax; polymerizable waxes; dimer acid; and dimer diol. One of these waxes may be singly used, or two or more of these may be used in combination.

A content of the gelling agent is preferably 0.01 wt % or more and 7.0 wt % or less based on the total mass of the ink, and is more preferably 0.2 wt % or more and 6.8 wt % or less based on the total mass of the ink. When the content of the gelling agent falls in this range, the pinning properties of the ink can be sufficiently increased to form images having higher definition.

(Crystalline Resin)

The actinic radiation-curable ink may further contain a crystalline resin.

When the ink is ejected to be attached to a recording medium or an intermediate transfer member, the crystalline resin crystallizes with the actinic radiation polymerizable compound held therein. Therefore, the crystalline resin can inhibit the actinic radiation polymerizable compound from exuding from dots formed by the landing of the ink. In this manner, the crystalline resin can inhibit the combining of neighboring dots otherwise caused, for example, through contact of the actinic radiation polymerizable compound exuded from the neighboring dots on the recording medium or the intermediate transfer member, and hence, images having little color bleeding and having high definition can be formed.

Besides, the crystalline resin can also improve the pinning properties of the actinic radiation-curable ink through its crystallization on the recording medium or the intermediate transfer member.

Furthermore, the crystalline resin improves internal cohesive force of the actinic radiation-curable ink owing to the affinity with the actinic radiation polymerizable compound similarly to the styrene (meth)acrylic acid ester copolymer. As a result, the crystalline resin inhibits the occurrence of scattering of minute sprays (satellites) from the ejected ink during the ejection of the actinic radiation-curable ink. Thus, the scattering of minute sprays onto a portion around a landing position of the ink can be inhibited, and hence, images having little image unevenness and having high definition can be formed.

Examples of the crystalline resin include polyethylene, polypropylene, nylon, polyacetal, polyethylene terephthalate (PET), polyphenyl sulfide and polyether ether ketone (PEEK), and crystalline polyester.

Among these crystalline resins, a crystalline polyester resin is preferred because of high affinity with the actinic radiation polymerizable compound. Here, the crystalline polyester resin refers to a crystalline resin obtained through a polycondensation reaction between a divalent or higher carboxylic acid (polycarboxylic acid compound) and a divalent or higher alcohol (polyhydric alcohol compound).

A polycarboxylic acid compound refers to a compound having, in one molecule, two or more carboxy groups, and an alkyl ester, an acid anhydride or an acid chloride of a polycarboxylic acid compound can be used.

Examples of the polycarboxylic acid compound include divalent aliphatic carboxylic acids such as oxalic acid, succinic acid, malonic acid, adipic acid, 3-methyl adipic acid, pimelic acid, azelaic acid, sebacic acid, nonanedicarboxylic acid, decanedicarboxylic acid, undecanedicarboxylic acid, dodecanedicarboxylic acid, maleic acid, fumaric acid, citraconic acid, diglycolic acid, cyclohexane-3,5-diene-1,2-dicarboxylic acid, malic acid, citric acid, hexahydroterephthalic acid, tartaric acid and mucic acid; divalent aromatic carboxylic acids such as phthalic acid, isophthalic acid, terephthalic acid, tetrachlorophthalic acid, chlorophthalic acid, nitrophthalic acid, p-carboxyphenylacetic acid, p-phenylenediacetic acid, m-phenylenediglycolic acid, p-phenylenediglycolic acid, o-phenylenediglycolic acid, diphenyl-p,p'-dicarboxylic acid, naphthalene-1,4-dicarboxylic acid, naphthalene-1,5-dicarboxylic acid, naphthalene-2,6-dicarboxylic acid, anthracenedicarboxylic acid and dodecenylsuccinic acid; and trivalent or higher aromatic carboxylic acids such as trimellitic acid, pyromellitic acid, naphthalenetricarboxylic acid, naphthalenetetracarboxylic acid, pyrenetricarboxylic acid and pyrenetetracarboxylic acid.

From the viewpoint of improving the crystallinity of the crystalline resin, a divalent aliphatic carboxylic acid is preferred among the polycarboxylic acid compounds. One of these polycarboxylic acids may be singly used, or two or more of these may be used in combination.

A polyhydric alcohol compound refers to a compound having, in one molecule, two or more hydroxy groups.

Examples of the polyhydric alcohol compound include divalent linear aliphatic alcohols such as ethylene glycol, propylene glycol, butanediol, diethylene glycol, hexanediol, octanediol, decanediol and dodecanediol; divalent alicyclic alcohols such as cyclohexanediol; divalent aromatic alcohols such as an ethylene oxide adduct of bisphenol A and a propylene oxide adduct of bisphenol A; trivalent or higher aliphatic alcohols such as glycerin and pentaerythritol; and alcohols each having a trivalent or higher guanidine skeleton such as hexamethylol melamine, tetramethylol benzoguanamine and tetraethylol benzoguanamine.

From the viewpoint of improving the crystallinity of the crystalline resin, a divalent aliphatic alcohol is preferred, and a divalent linear aliphatic alcohol is more preferred among the polyhydric alcohol compounds. One of these polyhydric alcohol compounds may be singly used, or two or more of these may be used in combination.

A ratio between the polyhydric alcohol compound and the polycarboxylic acid compound in the monomer used for synthesizing the crystalline resin is, in terms of an equivalence ratio [OH]/[COOH] between a hydroxy group [OH] of the polyhydric alcohol compound and a carboxy group [COOH] of the polycarboxylic acid compound, preferably 2.0/1.0 to 1.0/2.0, and more preferably 1.5/1.0 to 1.0/1.5.

Besides, specific examples of a combination of the polycarboxylic acid compound and the polyhydric alcohol compound employed for forming the crystalline resin include a combination of 1,12-dodecanediol (carbon number of 12) and succinic acid (carbon number of 4), a combination of 1,12-dodecanediol (carbon number of 12) and sebacic acid (carbon number of 10), a combination of ethylene glycol (carbon number of 2) and sebacic acid (carbon number of 10), a combination of 1,6-hexanediol (carbon number of 6) and sebacic acid (carbon number of 10), a combination of 1,6-hexanediol (carbon number of 6) and decanedicarboxylic acid (carbon number of 12), a combination of 1,9-nonanediol (carbon number of 9) and decanedicarboxylic acid (carbon number of 12) and a combination of ethylene glycol (carbon number of 2) and dodecanedicarboxylic acid (carbon number of 14).

A content of the crystalline resin is preferably 0.1 to 10.0 wt %, and more preferably 0.2 to 6.0 wt % based on the total mass of the ink. When the crystalline resin is contained in a content of 0.1 wt % or more, the internal cohesive force of the ink owing to the affinity between the actinic radiation polymerizable compound and the crystalline resin contained in the ink is sufficiently increased, so that the occurrence of satellites can be inhibited during the ejection of the ink. When the content of the crystalline resin is 10.0 wt % or less, deterioration of ejection properties of the ink due to excessively increased internal cohesive force of the ink can be inhibited.

(Polymerization Initiator)

The actinic radiation-curable ink may further contain a polymerization initiator if necessary. The polymerization initiator is not limited as long as it can start polymerization of the actinic radiation polymerizable compound. For example, when the actinic radiation-curable ink contains a radical polymerizable compound, the polymerization initiator can be a photo-radical initiator, and when the actinic radiation-curable ink contains a cationic polymerizable compound, the polymerization initiator can be a photocationic initiator (photoacid generator). When the actinic radiation-curable ink can be sufficiently cured without using a polymerization initiator, as when the actinic radiation-curable ink is cured through irradiation with electron beams, there is no need to use the polymerization initiator.

The radical polymerization initiator encompasses an intramolecular bond cleavage type radical polymerization initiator and an intramolecular hydrogen abstraction type radical polymerization initiator.

Examples of the intramolecular bond cleavage type radical polymerization initiator include acetophenone-based initiators including diethoxyacetophenone, 2-hydroxy-2-methyl-1-phenylpropan-1-one, benzyl dimethyl ketal, 1-(4-isopropylphenyl)-2-hydroxy-2-methylpropan-1-one, 4-(2-hydroxyethoxy)phenyl-(2-hydroxy-2-propyl)ketone, 1-hydroxycyclohexyl-phenylketone, 2-methyl-2-morpholino(4-methylthiophenyl)propan-1-one and 2-benzyl-2-dimethylamino-1-(4-morpholinophenyl)-butanone, benzoins including benzoin, benzoin methyl ether and benzoin isopropyl ether, acylphosphine oxide-based initiators including phenylbis(2,4,6-trimethylbenzoyl)phosphine oxide, and benzyl and methylphenylglyoxy ester.

Examples of the intramolecular hydrogen abstraction type radical polymerization initiator include benzophenone-based initiators including benzophenone, methyl o-benzoyl benzoate, 4-phenylbenzophenone, 4,4'-dichlorobenzophenone, hydroxybenzophenone, 4-benzoyl-4'-methyl-diphenyl sulfide, acrylated benzophenone, 3,3',4,4'-tetra(t-butylperoxycarbonyl)benzophenone and 3,3'-dimethyl-4-methoxybenzophenone, thioxanthone-based initiators including 2-isopropylthioxanthone, 2,4-dimethylthioxanthone, 2,4-diethylthioxanthone and 2,4-dichlorothioxanthone, aminobenzophenone-based initiators including Michler's ketone and 4,4'-diethylaminobenzophenone, 10-butyl-2-chloroacridone, 2-ethylanthraquinone, 9,10-phenanthrenequinone, and camphorquinone.

Examples of the cationic polymerization initiator include a photo-acid generator. Examples of the photo-acid generator include $B(C_6F_5)_4^-$, $PF_6^-$, $AsF_6^-$, $SbF_6^-$, and $CF_3SO_3^-$ salts of aromatic onium compounds such as diazonium, ammonium, iodonium, sulfonium, and phosphonium, a sulfonated product that generates sulfonic acid, a halide that generates hydrogen halide, and an iron arene complex.

A content of the polymerization initiator can be arbitrarily set in a range where the actinic radiation-curable ink is sufficiently cured through irradiation with the actinic radiation and the ejection properties of the actinic radiation-curable ink are not deteriorated. A content of the polymerization initiator is, for example, preferably 0.1 wt % or more and 20 wt % or less, and more preferably 1.0 wt % or more and 12 wt % or less based on the total mass of the actinic radiation-curable ink.

(Water Content)

A water content in the actinic radiation-curable ink corresponds to a content derived from the styrene (meth)acrylic acid ester copolymer and a content positively added, and when the water content largely exceeds 30 wt % based on the total amount of the ink, the ink is difficult to eject. When the water content is 30 wt % or less, however, the water content can be used for adjusting the viscosity, adjusting the surface tension, and optimizing an ejection state and wetting and spreading properties obtained after the landing (Colorant)

A colorant encompasses a pigment and a dye. From the viewpoint of further improving dispersion stability of the ink and forming a highly weather-resistant image, the colorant is preferably a pigment.

Examples of the pigment include the following organic pigments and inorganic pigments described in Color Index.

Examples of a red or magenta pigment include Pigment Red 3, 5, 19, 22, 31, 38, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226 and 257, Pigment Violet 3, 19, 23, 29, 30, 37, 50 and 88, and Pigment Orange 13, 16, 20 and 36.

Examples of a blue or cyan pigment include Pigment Blue 1, 15, 15:1, 15:2, 15:3, 15:4, 15:6, 16, 17-1, 22, 27, 28, 29, 36 and 60.

Examples of a green pigment include Pigment Green 7, 26, 36 and 50.

Examples of a yellow pigment include Pigment Yellow, 1, 3, 12, 13, 14, 17, 34, 35, 37, 55, 74, 81, 83, 93, 94, 95, 97, 108, 109, 110, 137, 138, 139, 153, 154, 155, 157, 166, 167, 168, 180, 185 and 193.

Examples of a black pigment include Pigment Black 7, 26 and 28.

As a white pigment, titanium oxide or a hollow particle may be used.

Examples of the dye include various oil-soluble dyes.

A content of the pigment or the dye is preferably 0.1 wt % or more and 30 wt % or less, and more preferably 0.4 wt % or more and 20 wt % or less based on the total mass of the ink. When the content of the pigment or the dye is 0.1 wt % or more based on the total mass of the ink, a resultant image is sufficiently colored. When the content of the pigment or the dye is 20 wt % or less based on the total mass of the ink, the viscosity of the ink is prevented from excessively increasing.

(Dispersant)

The pigment may be dispersed with a dispersant.

Examples of the dispersant include a surfactant and a polymer dispersant, and the polymer dispersant is preferred.

Examples of the polymer dispersant include a (meth)acrylic resin, a styrene (meth)acrylic resin, a hydroxy group-containing carboxylic acid ester, a salt of a long chain polyaminoamide and a high molecular weight acid ester, a salt of a high molecular weight polycarboxylic acid, a salt of a long chain polyaminoamide and a polar acid ester, a high molecular weight unsaturated acid ester, modified polyurethane, modified polyacrylate, polyether ester type anionic activator, a naphthalene sulfonic acid-formalin condensate salt, an aromatic sulfonic acid-formalin condensate salt, polyoxyethylene alkyl phosphoric acid ester, polyoxyethylene nonylphenyl ether, stearylamine acetate and a pigment derivative. Such a polymer dispersant is usually a block copolymer, and adsorbs onto the pigment to be dispersed in the actinic radiation-curable ink.

The pigment may be further improved in the dispersibility by a dispersion aid if necessary.

A content of the dispersant is preferably 1.0 wt % or more and 200 wt % or less based on a total mass of the pigment.

A pigment dispersion can be prepared by dispersing the pigment in the actinic radiation polymerizable compound. The pigment may be dispersed using, for example, a ball mill, a sand mill, an attritor, a roll mill, an agitator, a Henschel mixer, a colloid mill, an ultrasound homogenizer, a pearl mill, a wet jet mill or a paint shaker. Here, the dispersant may be added thereto.

(Surfactant)

The actinic radiation-curable ink may contain a surfactant.

The surfactant can adjust the surface tension of the ink to adjust the wettability of the ink on a substrate after the landing or to inhibit a combination of neighboring droplets.

Examples of the surfactant include a nonionic surfactant, an anionic surfactant, a cationic surfactant, a silicon-based surfactant, an acetylene glycol-based surfactant and a fluorine-based surfactant having a perfluoroalkenyl group.

A content of the surfactant is preferably 0.001 wt % or more and 10 wt % or less, and more preferably 0.001 wt % or more and 1.0 wt % or less based on the total mass of the ink.

(Additional Components)

The actinic radiation-curable ink may contain, in addition to the aforementioned components, a polysaccharide, a viscosity modifier, a resistivity modifier, a film forming agent, an ultraviolet absorber, an antioxidant, a discoloration inhibitor, an antifungal agent, an anti-rust agent or the like if necessary.

(Physical Properties of Actinic Radiation-Curable Ink)

From the viewpoint of improving ejection properties from an inkjet head, the actinic radiation-curable ink has a viscosity at an ejection temperature of preferably 3 mPa·s or more and 20 mPa·s or less. Besides, from the viewpoint of causing sufficient gelation of the ink having landed and cooled to ordinary temperature, the viscosity of the actinic radiation-curable ink at 25° C. is preferably 1,000 mPa·s or more.

The viscosity and phase transition temperature of the actinic radiation-curable ink can be obtained by measuring change with temperature of dynamic viscoelasticity of the ink with a rheometer. For example, the actinic radiation-curable ink is heated to 100° C., and while the viscosity thereof is being measured with a stress-controlled rheometer, "MCR302" (manufactured by Anton Paar GmbH (diameter of cone plate: 75 mm, cone angle: 1.0°), the ink is cooled to 20° C. under conditions of a shear rate of 11.7 (1/s) and a temperature decreasing rate of 0.1° C./s to obtain a temperature change curve of the viscosity. The phase transition temperature is obtained as a temperature on the temperature change curve of the viscosity at which the viscosity is 200 mPa·s.

[Preparation Method for Ink]

The actinic radiation-curable ink can be prepared by mixing, under heating, the actinic radiation polymerizable compound, the styrene (meth)acrylic acid ester copolymer, and an arbitrary additional component. At this point, the thus obtained mixed solution is preferably filtered through a prescribed filter. Besides, in preparation of the actinic radiation-curable ink containing a pigment and a dispersant, a pigment dispersion in which the pigment and the dispersant are dispersed in the actinic radiation polymerizable compound or the like may be precedently prepared, to which the other components may be added to be mixed under heating.

[Image Forming Method]

An image forming method according to the present invention is an image forming method using the actinic radiation-curable ink described above.

An image forming method according to the present embodiment includes ejecting the actinic radiation-curable ink from an inkjet head; and irradiating, with an actinic radiation, the actinic radiation-curable inkjet ink ejected from the inkjet head and attached to a recording medium. The actinic radiation-curable ink ejected may directly land on a surface of the recording medium or may be transferred onto the surface of the recording medium after landing on a surface of an intermediate transfer member.

When a multicolored image is to be formed by ejecting and landing droplets of the actinic radiation-curable inks of a plurality of colors, at least one of the plurality of the actinic radiation-curable inks is the present actinic radiation-curable ink. It is noted that two or more of the actinic radiation-curable inks to be ejected are preferably the present actinic radiation-curable ink (namely, droplets of the plurality of the actinic radiation-curable inks each having a different composition are preferably ejected to land on the recording medium). From this point of view, all of the actinic radiation-curable inks to be ejected are the present actinic radiation-curable ink.

Here, it is preferred that the actinic radiation-curable ink held in the inkjet head is adjusted, by heating or the like, to have a temperature equal to or higher than a temperature lower by 60° C. than the softening point of the styrene (meth)acrylic acid ester copolymer, so as to eject the thus heated actinic radiation-curable ink. Thus, the styrene (meth)acrylic acid ester copolymer can be kept in a dissolved state, and hence the occurrence of satellites can be more sufficiently inhibited. It is indispensable that the temperature of the actinic radiation-curable ink to be ejected is equal to or higher than a temperature at which the styrene (meth)acrylic acid ester copolymer can be kept in a dissolved state in the actinic radiation polymerizable compound working as the solvent phase, and is equal to or lower than a temperature at which the actinic radiation polymerizable compound does not boil.

From the viewpoint of further improving the ejection stability, the viscosity of the actinic radiation-curable ink at a temperature within the inkjet head is preferably 3 mPa·s or more and less than 20 mPa·s.

When an actinic radiation-curable ink containing a gelling agent is used, the temperature of the actinic radiation-curable ink within the inkjet head is preferably set to a temperature higher than the gelation temperature of the actinic radiation-curable ink by 10° C. or more and less than 40° C. When the temperature of the actinic radiation-curable ink within the inkjet head is higher than the gelation temperature by 10° C. or more, the actinic radiation-curable ink is prevented from undergoing gelation within the inkjet head or on a surface of a nozzle, and the actinic radiation-curable ink can be satisfactorily ejected. Besides, when the temperature of the actinic radiation-curable ink within the inkjet head is higher than the gelation temperature by less than 40° C., thermal load of the inkjet head can be reduced. In particular, when the inkjet head uses a piezoelectric element, the performance can be easily degraded by the thermal load, and hence, the temperature of the actinic radiation-curable ink is particularly preferably set within the aforementioned range.

Here, the temperature of the surface of the recording medium or the surface of the intermediate transfer member on which the ejected actinic radiation-curable ink lands is adjusted preferably to a temperature equal to or lower than a temperature lower by 40° C. than the softening point of the styrene (meth)acrylic acid ester copolymer. Thus, the styrene (meth)acrylic acid ester copolymer holding the actinic radiation polymerizable compound is easily solidified after the landing, and hence, the pinning properties of the actinic radiation-curable ink can be improved as well as the actinic radiation polymerizable compound can be inhibited from exuding from dots formed by the landing of the actinic radiation-curable ink.

The irradiation with the actinic radiation is performed within 10 seconds, preferably 0.001 to 5 seconds, and more preferably 0.01 to 2 seconds after the droplets of an ink composition are attached to the recording medium for inhibiting the adjacent droplets of the ink composition from mixing with each other. The irradiation with the actinic radiation is performed preferably after ejecting the ink composition from all inkjet heads accommodated in a head carriage.

Examples of the actinic radiation include infrared light, electron beams, ultraviolet light, $\alpha$ rays, $\gamma$ rays and X rays. Among these, irradiation with ultraviolet light is preferred because of high handleability, and irradiation with electron beams is preferred from the viewpoint that the actinic radiation-curable ink can be easily cured. From the viewpoint of inhibiting occurrence of insufficient curing of the actinic radiation-curable ink otherwise caused when the actinic radiation-curable ink is melted by radiant heat from a light source, the light source of ultraviolet light is preferably a light emitting diode (LED). Examples of the LED light source capable of irradiation with the actinic radiation for curing an ink include 395 nm water-cooled LEDs manufactured by Phoseon Technology, Inc., Heraeus, Kyocera Corporation, HOYA Corporation and Integration Technology Co., Ltd.

Energy of the radiation for irradiation is preferably 200 mJ/cm$^2$ or more and 1,000 mJ/cm$^2$ or less. When the energy is 200 mJ/cm$^2$ or more, the actinic radiation polymerizable compound can be sufficiently polymerized and crosslinked. When the energy is 1,000 mJ/cm$^2$ or less, the pinning properties are difficult to be degraded by the gelling agent re-dissolved by heat of the actinic radiation for irradiation. From these points of view, the energy of the actinic radiation for irradiation is more preferably 300 mJ/cm$^2$ or more and 800 mJ/cm$^2$ or less, and further preferably 350 mJ/cm$^2$ or more and 500 mJ/cm$^2$ or less.

When the electron beams are used as the actinic radiation, an acceleration voltage of the electron beam irradiation is preferably 30 to 250 kV, and more preferably 30 to 100 kV for performing sufficient curing. When the acceleration voltage is 100 to 250 kV, an electron beam radiation dose is preferably 5 to 200 kGy, and more preferably 20 to 90 kGy.

A total ink thickness after curing is preferably 0.5 to 25 μm. The term "total ink thickness" refers to a maximum value of a thickness of the ink composition drawn on a recording medium and cured thereon.

The recording medium is not limited as long as an image can be formed thereon by the inkjet method, and examples include absorbable media including coated paper and uncoated paper, such as art paper, coated paper, light-weight coated paper, finely coated paper and cast paper, non-absorbable recording media including plastics such as polyester, polyvinyl chloride, polyethylene, polyurethane, polypropylene, an acrylic resin, polycarbonate, polystyrene, an acrylonitrile-butadiene-styrene copolymer, polyethylene terephthalate and polybutadiene terephthalate, an intermediate transfer member, and non-absorbable inorganic recording media such as metals and glass. As various plastic films, for example, a PP film, a PET film, an OPS film, an OPP film, an ONy film, a PVC film, a PE film and a TAC film can be used. As other plastics, polycarbonate, acrylic resins, ABS, polyacetal, PVA and rubbers can be used. Since the ink of the present invention is capable of forming an image with a higher gloss than a conventional ink, coated paper having comparatively high gloss is suitably used.

[Image Forming Apparatus]

Figure 1:
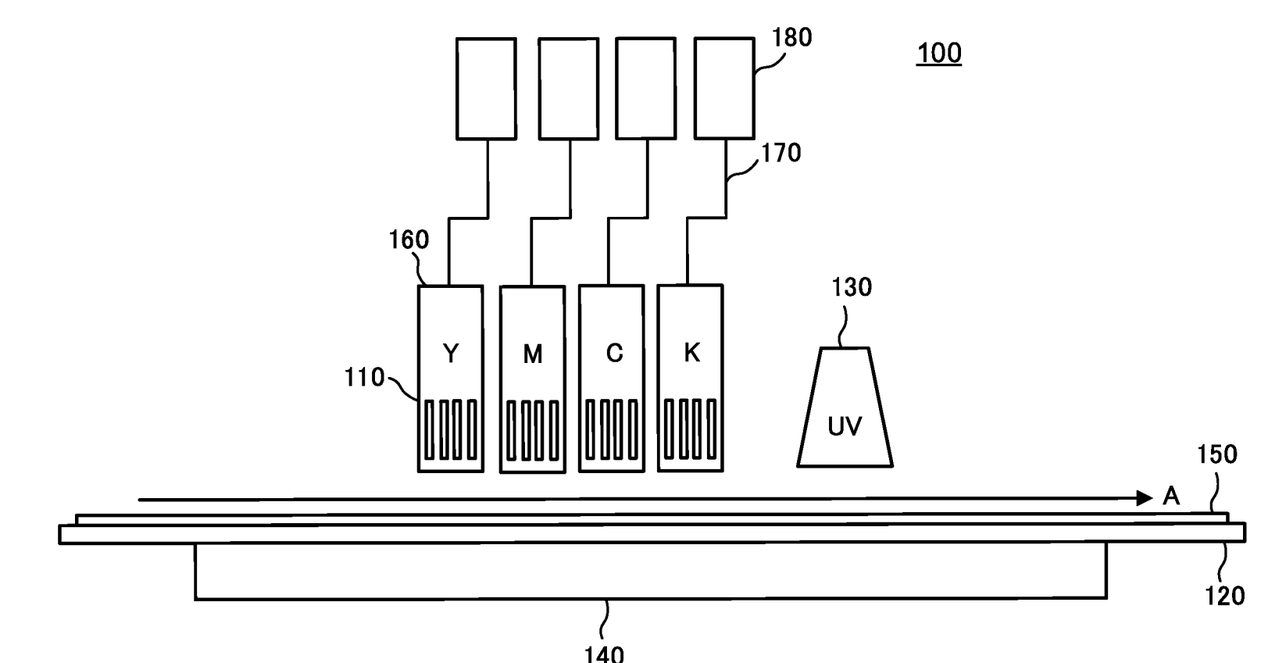
FIG. 1 is a schematic diagram illustrating an exemplified structure of an image forming apparatus according to an embodiment of the present invention.

FIG. 1 is a schematic diagram illustrating an exemplified structure of image forming apparatus 100 according to an embodiment of the present invention (hereinafter simply referred to also as the "image forming apparatus"). As illustrated in FIG. 1, image forming apparatus 100 includes inkjet heads 110, conveyance path 120, actinic radiation irradiation section 130 and temperature control section 140. In FIG. 1, arrow A corresponds to a conveying direction of recording medium 150. Inkjet heads 110 and actinic radiation irradiation section 130 are disposed close to conveyance path 120 in the order mentioned from an upstream side to a down stream side along the conveying direction of the recording medium Image forming apparatus 100 may include an oxygen concentration adjustment section (not shown) for adjusting an oxygen concentration during the irradiation of the ink with the actinic radiation.

The image forming apparatus of the present embodiment is an image forming apparatus that forms an image using the above-described actinic radiation-curable ink.

An image forming apparatus of an actinic radiation-curable inkjet system is categorized to an apparatus of a line recording system (single-pass recording system) and an apparatus of a serial recording system. Any of these systems may be selected depending on the required resolution of an image and the required recording speed, and the line recording system (single-pass recording system) is preferred from the viewpoint of high-speed recording.

As illustrated in FIG. 1, image forming apparatus 100 further includes ink flow paths 170 connected to head carriage 160 accommodating inkjet heads 110 for the actinic radiation-curable inks, and ink tanks 180 holding the inks to be supplied through ink flow paths 170, respectively.

Head carriage 160 accommodates inkjet heads 110. Head carriage 160 includes inkjet heads of respective colors of yellow (Y), magenta (M), cyan (C) and black (K). Head carriage 160 is disposed to be fixed, for example, so as to cover the whole width of recording medium 150.

Ink tanks 180 accommodate the actinic radiation-curable inks of the above-described colors, respectively. The inks are supplied to inkjet heads 110 from ink tanks 180.

Each ink tank 180 is connected to head carriage 160 through ink flow path 170. Ink flow path 170 is a path through which the ink held in ink tank 180 is supplied to head carriage 160. In order to stably eject ink droplets, the inks held in ink tanks 180, ink flow paths 170, head carriage 160 and inkjet heads 110 are heated preferably to a temperature equal to or higher than a temperature lower by 60° C. than the softening point of the styrene (meth)acrylic acid ester copolymer.

Inkjet head 110 ejects the actinic radiation-curable ink supplied from ink tank 180 through ink flow path 170 to head carriage 160. At this point, the temperature of the actinic radiation-curable ink to be ejected is adjusted by, for example, heating the actinic radiation-curable ink via ink tank 180, ink flow path 170, head carriage 160, inkjet head 110 or the like to a temperature equal to or higher than the temperature lower by 60° C. than the softening point of the styrene (meth)acrylic acid ester copolymer.

Actinic radiation irradiation section 130 is disposed to cover the whole width of recording medium 150 on the downstream side from head carriage 160 in conveying direction A of recording medium 150. Actinic radiation irradiation section 130 irradiates, with the actinic radiation, ink droplets ejected from inkjet heads 110 and attached to recording medium 150, and thus, the droplets are cured.

Temperature control section 140 is disposed below recording medium 150 for adjusting the temperature of recording medium 150 to a temperature lower by 40° C. than the softening point of the styrene (meth)acrylic acid ester copolymer. Temperature control section 140 can be any of various heaters and the like. Thus, the styrene (meth)acrylic acid ester copolymer holding the actinic radiation polymerizable compound can be easily solidified after the landing, and hence, the pinning properties of the actinic radiation-curable ink can be improved as well as the actinic radiation polymerizable compound can be inhibited from exuding from dots formed by the landing of the actinic radiation-curable ink.

Image forming apparatus 100 may further include an oxygen concentration adjustment section (not shown) that adjusts an oxygen concentration during the irradiation with the actinic radiation. The oxygen concentration adjustment section adjusts an oxygen concentration in an atmosphere surrounding the surface of recording medium 150 to which the ink has been attached when the irradiation with the actinic radiation by actinic radiation irradiation section 130 takes place.

The image forming apparatus according to the present embodiment may employ a structure in which an intermediate transfer member not shown is included so as to cause the actinic radiation-curable ink ejected from the inkjet head to land on a surface of the intermediate transfer member and to transfer the ink thereafter from the intermediate transfer member onto a recording medium. At this point, the temperature control section preferably adjusts the temperature of the surface of the intermediate transfer member to the temperature lower by 40° C. than the softening point of the styrene (meth)acrylic acid ester copolymer.

Examples

The present invention will now be more specifically described with reference to the following tests, and it is noted that the present invention is not limited by these tests.

[Synthesis of Resins]

(Resin 1)

A 500 cc reaction vessel equipped with a stirrer, a temperature sensor, a condenser and a nitrogen introducing device was charged with 1.0 part by mass of sodium dodecyl sulfate and 200 parts by mass of ion-exchanged water, and the internal temperature was increased to 80° C. under stirring at a rate of 230 rpm under a nitrogen stream. After increasing the temperature, 0.5 parts by mass of potassium persulfate was added thereto, the temperature of the resultant solution was set to 80° C. again, and in the presence of an appropriate amount of a chain transfer agent, a water content of an emulsified and dispersed aqueous solution of a copolymer obtained by appropriately adding the following monomers is dried and solidified to obtain resin 1, that is, a styrene (meth)acrylic acid ester copolymer.

Styrene monomer: 70.0 parts by mass
Butyl acrylate: 30.0 parts by mass
Methacrylic acid: 5.0 parts by mass Resin 1 thus obtained had a weight average molecular weight of 4,350 g/mol, an acid value of 24 mgKOH/g, a softening point of 53° C., and a glass transition point of 28° C.

(Resin 2)

Resin 2 was prepared in the same manner as resin 1 except that the contents of the respective components were changed as shown in Table 1.

Resin 2 thus obtained had a weight average molecular weight of 33,100 g/mol, an acid value of 24 mgKOH/g, a softening point of 115° C., and a glass transition point of 57° C.

(Resin 3)

Resin 3 was prepared in the same manner as resin 1 except that the monomers were changed to compounds mentioned below, and that chain transfer agent 1 was changed to chain transfer agent 2.

Styrene monomer: 70.0 parts by mass
2-Ethylhexyl acrylate: 40.0 parts by mass
Methacrylic acid: 10.0 parts by mass Resin 3 thus obtained had a weight average molecular weight of 38,500 g/mol, an acid value of 55 mgKOH/g, a softening point of 94° C., and a glass transition point of 38° C.

(Comparative Resin)

A comparative resin was prepared in the same manner as resin 1 except that two chain transfer agents were used instead of one chain transfer agent.

Styrene monomer: 70.0 parts by mass
Butyl acrylate: 30.0 parts by mass
Methacrylic acid: 5.0 parts by mass
Chain transfer agent 1: 1.0 part by mass
Chain transfer agent 2: 0.3 parts by mass The comparative resin thus obtained had a weight average molecular weight of 35,050 g/mol, an acid value of 25 mgKOH/g, a softening point of 125° C., and a glass transition point of 42° C.

The physical properties (the weight average molecular weights, the acid values, the softening points and the glass transition points) of resins 1 to 3 and the comparative resin were measured as follows:

(Weight Average Molecular Weight)

The weight average molecular weight was measured as follows:

A GPC apparatus, HLC-8120GPC (manufactured by Tosoh Corporation) and a column, TSKguard Column+ TSKgel Super HZ-m triple (manufactured by Tosoh Corporation) were used, and with a column temperature kept at 40° C., tetrahydrofuran was caused to flow as a carrier solvent at a flow rate of 0.2 mL/min. 10 μL of a prepared sample solution was injected into the GPC apparatus together with the carrier solvent so as to detect the sample using a diffractive index detector (RI detector), and the molecular weight distribution of the sample was calculated by using a polystyrene standard calibration curve.

(Acid Value)

The acid value was measured in accordance with JIS K0070-1992 (Neutralization Titration). Specifically, the copolymer hardened by drying was diluted with methyl cellosolve by 50 times, and the resultant was titrated with 0.1 mol/L potassium hydroxide. An inflection point of a pH curve obtained using a pH meter was defined as a neutralization point. The acid value was calculated based on the amount of potassium hydroxide necessary for reaching this neutralization point.

(Softening Point)

The softening point was measured as follows:

First, 1.0 g of the styrene (meth)acrylic acid ester copolymer was put and leveled in a petri dish in an environment of 20±1° C. and 50±5% RH, and was allowed to stand for 12 hours. Then, a force of 20 kgf/cm$^2$ was applied thereto for 30 seconds using a molding machine, "SSP-10A" (manufactured by Shimadzu Corporation) to prepare a cylindrical molded sample having a diameter of 1 cm. Subsequently, in an environment of 24±5° C. and 50±20% RH, the molded sample was subjected measurement with a flow tester, "CFT-500D" (manufactured by Shimadzu Corporation) under conditions of a load of 180 N, a starting temperature of 20° C., a preheating time of 300 seconds, and a temperature increasing rate of 3° C./min. Here, the sample was extruded through a hole (1 mm×1 mm) of a cylindrical die by using a piston having a diameter of 1 cm after the completion of the preheating time, and an offset method temperature Toffset measured with an offset value set to 5 mm by a melting temperature measuring method through temperature elevation was defined as the softening point of the styrene (meth)acrylic acid ester copolymer.

(Glass Transition Point)

The glass transition point was measured as follows:

A differential scanning calorimeter, "DSC 250" (manufactured by TA Instruments, Inc.) was used, 5.0 mg of the styrene (meth)acrylic acid ester copolymer was sealed in an aluminum pan, and the resultant was set on a holder. As a reference, an empty aluminum pan was used. As heating/cooling conditions, the sample was allowed to stand at −30° C. for 1 minute, heated to 100° C. at a rate of 10° C./min (first heating process), allowed to stand at 100° C. for 1 minute, and then cooled to 0° C. at a rate of 10° C./min (first cooling process). Subsequently, the resultant sample was allowed to stand at 0° C. for 1 minute, and then heated to 100° C. at a rate of 10° C./min (second heating process). Then, an endothermic peak temperature in the second heat (second heating process) was obtained, and the thus obtained value was defined as the glass transition point.

Table 1 shows contents (in parts by mass) of the respective components of resins 1 to 3 and the comparative resin.

TABLE 1

|  |  | Resin 1 | Resin 2 | Resin 3 | Comparative Resin |
|---|---|---|---|---|---|
| Prescription (parts by mass) | Styrene Monomer | 70 | 70 | 70 | 70 |
|  | Butyl Acrylate | 30 | 15 | — | 30 |
|  | 2-Ethylhexyl Acrylate | — | — | 40 | — |
|  | Methacrylic Acid | 5 | 5 | 10 | 5 |
|  | Chain Transfer Agent 1 | 4 | 1 | — | 1 |
|  | Chain Transfer Agent 2 | — | — | 2 | 0.3 |
| Physical Properties | Weight Average Molecular Weight (g/mol) | 4350 | 33100 | 38500 | 35050 |
|  | Acid Value (mgKOH/g) | 24 | 24 | 55 | 25 |
|  | Softening Point (° C.) | 53 | 115 | 94 | 125 |
|  | Glass Transition Point (° C.) | 28 | 57 | 38 | 42 |

(Preparation of Solvent Phase)

The solvent phase is a mixture of actinic radiation polymerizable compounds, a pigment and a polymerization initiator shown in Table 2.

TABLE 2

|  | Content |
|---|---|
| Monofunctional Monomer 1 | 12 |
| Monofunctional Monomer 2 | 16 |
| Difunctional Monomer 1 | 38 |
| Difunctional Monomer 2 | 20 |
| Trifunctional Monomer 1 | 6 |
| Trifunctional Monomer 2 | 3 |
| Pigment | 4 |
| Polymerization Initiator | 1 |

Terms shown in Table 2 have the following meaning:

Monofunctional monomer 1: methoxy polyethylene glycol #400 acrylate

Monofunctional monomer 2: phenoxy ethylene glycol methacrylate

Difunctional monomer 1: polyethylene glycol #200 diacrylate

Difunctional monomer 2: polypropylene glycol #400 dimethacrylate

Trifunctional monomer 1: trimethylolpropane triacrylate

Trifunctional monomer 2: ethoxylated glycerin triacrylate

Pigment: Pigment Blue 15

Polymerization initiator: phenylbis(2,4,6-trimethylbenzoyl)phosphine oxide (Preparation of Ink)

An ink containing the styrene(meth)acrylic acid ester copolymer was prepared as described below.

Besides, a crystalline resin used in each example was prepared as follows:

(Preparation of Crystalline Resin)

The following raw material compounds were put in a four-necked flask equipped with a nitrogen introducing tube, a dehydration tube, a stirrer and a thermocouple, and were dissolved by heating the resultant to 170° C. to obtain the crystalline resin.

Dodecanedicarboxylic acid: 103.0 parts by mass

Ethylene glycol: 24.7 parts by mass (Ink 1)

A stainless steel beaker was charged with resin 1 (15 parts by mass), a mixture (70 parts by mass) of actinic radiation polymerizable compounds and a difunctional monomer (18 parts by mass), followed by stirring for 1 hour under heating with a hot plate at a temperature higher than the softening point of the copolymer by 20° C. The thus obtained solution was filtered, under heating, through a Teflon® 3 μm membrane filter manufactured by ADVANTEC to obtain ink 1.

Inks 2 to 11 shown in Table 3 were prepared so as to obtain a viscosity at an ejection temperature of 10±2 mPa·s by increasing the amount of difunctional monomer 2.

Besides, as shown in Table 3, also in the preparation of each of inks 2 to 11, the obtained solution was dissolved by heating at a temperature higher, by 20° C., than a higher one of the softening points and melting points of added solids.

(Ink 2)

Ink 2 was obtained in the same manner as ink 1 except that resin 1 was changed to resin 2 and that the content of the difunctional monomer was changed from 18 parts by mass to 21 parts by mass (Ink 3)

Ink 3 was obtained in the same manner as ink 1 except that resin 1 was changed to resin 3 and that the content of the difunctional monomer was changed from 18 parts by mass to 23 parts by mass (Ink 4)

Ink 4 was obtained in the same manner as ink 1 except that resin 1 (10 parts by mass), resin 3 (10 parts by mass), a mixture (70 parts by mass) of the actinic radiation polymerizable compounds and the difunctional monomer (28 parts by mass) were used.

(Ink 5)

Ink 5 was obtained in the same manner as ink 1 except that resin 1 (15 parts by mass), a mixture (70 parts by mass) of the actinic radiation polymerizable compounds, a gelling agent, "Nissan Electrol WEP2" (manufactured by NOF Corporation, "Nissan Electrol" being their registered trademark) (3 parts by mass) and the difunctional monomer (12 parts by mass) were used.

(Ink 6)

Ink 6 was obtained in the same manner as ink 1 except that resin 1 (10 parts by mass), a mixture (70 parts by mass) of the actinic radiation polymerizable compounds, the crystalline resin (3 parts by mass) and the difunctional monomer (10 parts by mass) were used.

(Ink 7)

Ink 7 was obtained in the same manner as ink 1 except that resin 1 (15 parts by mass), a mixture (70 parts by mass) of the actinic radiation polymerizable compounds, the gelling agent, "Nissan Electrol WEP2" (2 parts by mass), the crystalline resin (3 parts by mass) and the difunctional monomer (16 parts by mass) were used.

(Ink 8)

Ink 8 was obtained in the same manner as ink 1 except that resin 1 was changed to the comparative resin, and that the content of the difunctional monomer was changed from 18 parts by mass to 15 parts by mass.

(Inks 9 to 11)

Inks 9 to 11 each containing none of resins 1 to 3 and the comparative resin were obtained.

The contents of the respective components of inks 1 to 11 are shown in Table 3.

TABLE 3

| | Ink | | | | | | | | | | |
|---|---|---|---|---|---|---|---|---|---|---|---|
| | Example | | | | | | | Comparative Example | | | |
| | 1 | 2 | 3 | 4 | 5 | 6 | 7 | 8 | 9 | 10 | 11 |
| Resin 1 | 15 | — | — | 10 | 15 | 10 | 15 | — | — | — | — |
| Resin 2 | — | 15 | — | — | — | — | — | — | — | — | — |
| Resin 3 | — | — | 15 | 10 | — | — | — | — | — | — | — |
| Comparative Resin | — | — | — | — | — | — | — | 15 | — | — | — |
| Gelling Agent | — | — | — | — | 3 | — | 2 | — | 3 | — | — |
| Crystalline | — | — | — | — | — | 3 | 3 | — | — | 3 | — |

TABLE 3-continued

| | Ink | | | | | | | | | | |
|---|---|---|---|---|---|---|---|---|---|---|---|
| | Example | | | | | | | Comparative Example | | | |
| | 1 | 2 | 3 | 4 | 5 | 6 | 7 | 8 | 9 | 10 | 11 |
| Resin Mixture | 70 | 70 | 70 | 70 | 70 | 70 | 70 | 70 | 70 | 70 | 70 |
| Difunctional Monomer | 18 | 21 | 23 | 28 | 12 | 10 | 16 | 15 | 2 | 30 | — |

With respect to each of inks 1 to 11, a satellite occurrence rate was measured and dot collapse was evaluated under the following conditions.

[Satellite Occurrence Rate]
(Measurement Method)

For measuring the satellite occurrence rate, an inkjet head, KM512MHX manufactured by Konica Minolta, Inc. was used, and an ejection drive voltage and an ejection temperature were changed based on conditions under which an ink for an inkjet printer, KM-1 manufactured by Konica Minolta, Inc. can be normally ejected, and thus, an ink scattering state was measured using a high speed camera. When the satellite occurrence rate was 7.0 m/s or more, it was determined that the ink has ink characteristics capable of contributing to great speed increase and downsizing of a printing apparatus.

[Evaluation of Dot Collapse]
(Evaluation Method)

For evaluating the dot collapse, the ink was ejected at a rate lower by 0.2 m/s than the satellite occurrence rate found for satellite evaluation as described above to form a halftone image on an ink nonabsorbable aluminum sheet and the resultant image was cured, and then, shapes of dots and color bias in dots were observed with an optical microscope. The evaluation was performed based on criteria of the following five ranks A, B, C, D and E, and an ink evaluated as any of three ranks A, B and C is practically applicable.

(Evaluation Criteria)
The evaluation criteria for the dot collapse are as follows:
A: Neither dot collapse nor color bias in dots is found.
B: Slight dot collapse and color bias in dots are found, which do not cause any problem.
C: Dot collapse and color bias in dots are found, which do not cause any problem.
D: Dot collapse and color bias in dots are found.
E: Dot collapse and color bias in dots are found in the whole image.

Results of the various evaluations of inks 1 to 11 are shown in Table 4.

TABLE 4

| | Ink | | | | | | | | | | |
|---|---|---|---|---|---|---|---|---|---|---|---|
| | Example | | | | | | | Comparative Example | | | |
| | 1 | 2 | 3 | 4 | 5 | 6 | 7 | 8 | 9 | 10 | 11 |
| Ink Ejection Temperature (° C.) | 25 | 65 | 44 | 44 | 70 | 80 | 80 | 70 | 70 | 55 | 70 |
| Ejection Temperature - Softening Point (° C.) | −28 | −50 | −50 | −50 | — | — | — | −55 | — | — | — |
| Satellite Occurrence Rate (m/s) | 8.5 | 9.1 | 7.6 | 7.9 | 8.3 | 8.4 | 7.5 | 6.6 | 6.3 | 6.6 | 6.2 |
| Recording Medium Temperature (° C.) | 10 | 60 | 45 | 10 | 50 | 40 | 40 | 60 | 10 | 10 | 10 |
| Recording Medium Temperature - Softening Point (° C.) | −43 | −55 | −49 | −84 | — | — | — | −65 | — | — | — |
| Dot Collapse | A | B | B | A | C | B | A | D | D | D | E |

It was found, based on the results of inks 1 to 11, that when an ink contains a styrene (meth)acrylic acid ester copolymer having a softening point of 30 to 120° C., the occurrence of satellites is inhibited even if the ink is ejected at a rate of 7.0 m/s or more. Although the principle is unknown, this is a remarkable effect as compared with a conventional known ink in which the styrene (meth)acrylic acid ester copolymer is not dissolved.

It was found, based on the results of inks 1 to 11, that when an ink contains a styrene (meth)acrylic acid ester copolymer having a softening point of 30 to 120° C., the dot collapse that can be caused after the ejected ink lands on a recording medium is inhibited. This is probably because phase change from a liquid state to a solid state rapidly proceeds when the temperature of the recording medium is decreased to be lower than the glass transition point by using the styrene (meth)acrylic acid ester copolymer having a glass transition point of 10 to 60° C. Besides, this is probably because the ink is cured from a softened state after the landing when the temperature of the recording medium is set to a temperature lower by 40° C. than the softening point of the styrene (meth)acrylic acid ester copolymer.

According to the actinic radiation-curable inkjet ink of the present invention, an actinic radiation-curable inkjet ink capable of inhibiting the occurrence of satellites and having high pinning properties can be provided. Therefore, the present invention is expected to increase the range of application of a reactive ink in the inkjet method and to contribute to development and spread of techniques of this field.

Although embodiments of the present invention have been described and illustrated in detail, the disclosed embodiments are made for purposes of illustration and example only and not limitation. The scope of the present invention should be interpreted by terms of the appended claims.

What is claimed is:

1. An actinic radiation-curable inkjet ink, comprising a linear styrene (meth)acrylic acid ester copolymer dissolved in an actinic radiation polymerizable compound,
   wherein the styrene (meth)acrylic acid ester copolymer has a softening point of 30 to 120° C., and
   a content of the styrene (meth)acrylic acid ester copolymer is 1 to 50 wt % based on a total mass of the actinic radiation-curable inkjet ink.

2. The actinic radiation-curable inkjet ink according to claim 1, wherein the content of the styrene (meth)acrylic acid ester copolymer is 2 to 30 wt % based on the total mass of the actinic radiation-curable inkjet ink.

3. The actinic radiation-curable inkjet ink according to claim 1, wherein the styrene (meth)acrylic acid ester copolymer has a weight average molecular weight (Mw) of 1,000 to 40,000 g/mol.

4. The actinic radiation-curable inkjet ink according to claim 1, wherein the styrene (meth)acrylic acid ester copolymer has a glass transition point of 10 to 60° C.

5. The actinic radiation-curable inkjet ink according to claim 1, wherein the styrene (meth)acrylic acid ester copolymer has an acid value of 60 mgKOH/g or less.

6. The actinic radiation-curable inkjet ink according to claim 1, wherein the styrene (meth)acrylic acid ester copolymer is a random copolymer.

7. The actinic radiation-curable inkjet ink according to claim 1, wherein the actinic radiation-curable inkjet ink comprises a plurality of the styrene (meth)acrylic acid ester copolymers each having a different softening point by 5° C. or more.

8. The actinic radiation-curable inkjet ink according to claim 1, wherein a solvent phase of the actinic radiation-curable inkjet ink is a mixture of at least two monomers that include at least one monomer selected from a monofunctional monomer and a difunctional monomer, and at least one monomer selected from a difunctional monomer and a trifunctional monomer.

9. The actinic radiation-curable inkjet ink according to claim 1, comprising a crystalline resin.

10. The actinic radiation-curable inkjet ink according to claim 1, comprising a gelling agent.

11. The actinic radiation-curable inkjet ink according to claim 1, comprising a colorant.

12. The actinic radiation-curable inkjet ink according to claim 1, wherein a water content based on the total mass of the actinic radiation-curable inkjet ink is 30 wt % or less.

13. An image forming method, comprising:
   ejecting, from an inkjet head, the actinic radiation-curable inkjet ink according to claim 1; and
   irradiating, with an actinic radiation, the actinic radiation-curable inkjet ink ejected from the inkjet head and attached to a recording medium.

14. The image forming method according to claim 13, wherein the ejecting is ejecting, from the inkjet head, the actinic radiation-curable inkjet ink adjusted to have a temperature equal to or higher than a temperature lower by 60° C. than the softening point of the styrene (meth)acrylic acid ester copolymer.

15. The image forming method according to claim 13,
   wherein the ejecting is ejecting the actinic radiation-curable inkjet ink from the inkjet head such that the actinic radiation-curable inkjet ink lands on a surface of a recording medium or a surface of an intermediate transfer member, and
   a temperature of the surface of the recording medium or the surface of the intermediate transfer member on which the actinic radiation-curable inkjet ink lands is adjusted to a temperature equal to or lower than a temperature lower by 40° C. than the softening point of the styrene (meth)acrylic acid ester copolymer.

16. The image forming method according to claim 13, wherein the actinic radiation is electron beams or ultraviolet light.

17. An image forming apparatus, comprising:
   an inkjet head that ejects the actinic radiation-curable inkjet ink according to claim 1; and
   an actinic radiation irradiator that irradiates, with an actinic radiation, the actinic radiation-curable inkjet ink ejected from the inkjet head and attached to a recording medium.

18. The image forming apparatus according to claim 17, wherein the inkjet head ejects the actinic radiation-curable inkjet ink adjusted to have a temperature equal to or higher than a temperature lower by 60° C. than the softening point of the styrene (meth)acrylic acid ester copolymer.

19. The image forming apparatus according to claim 17,
   wherein the image forming apparatus comprises a temperature adjuster that adjusts a temperature of a surface of a recording medium or a surface of an intermediate transfer member on which the actinic radiation-curable inkjet ink ejected from the inkjet head lands to a temperature equal to or lower than a temperature lower by 40° C. than the softening point of the styrene (meth)acrylic acid ester copolymer.

20. The image forming apparatus according to claim 17, wherein the actinic radiation irradiator performs irradiation with electron beams or ultraviolet light.

* * * * *